United States Patent
Zuniga (10) Patent No.: US 7,298,920 B2
(45) Date of Patent: Nov. 20, 2007

(54) METHOD AND DEVICE FOR DETERMINING ORIENTATION OF TEXT

(75) Inventor: Oscar A. Zuniga, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1065 days.

(21) Appl. No.: 10/460,544

(22) Filed: Jun. 11, 2003

(65) Prior Publication Data

US 2004/0252911 A1 Dec. 16, 2004

(51) Int. Cl.
*G06K 9/36* (2006.01)

(52) U.S. Cl. ......................... 382/290; 382/289

(58) Field of Classification Search ................ 382/290, 382/173, 177, 286, 288, 291, 292, 289
See application file for complete search history.

(56) References Cited

U.S. PATENT DOCUMENTS

| | | | |
|---|---|---|---|
| 5,557,689 A * | 9/1996 | Huttenlocher et al. ...... | 382/177 |
| 5,594,815 A * | 1/1997 | Fast et al. .................... | 382/254 |
| 5,854,853 A | 12/1998 | Wang | |
| 6,490,376 B1 | 12/2002 | Au et al. | |
| 6,574,375 B1 | 6/2003 | Cullen et al. | |

* cited by examiner

*Primary Examiner*—Yon J. Couso (57) ABSTRACT

A method of determining the orientation of text is disclosed herein. An embodiment of the method may comprise measuring the contrasts associated with an upper edge of the text relative to a background. A first length of the upper edge of text having contrasts that are at least a first preselected value is measured. In addition to measuring the contrasts associated with the upper edge of the text, contrasts associated with a lower edge of the text are measured relative to the background. A second length of the lower edge of text having contrasts that are at least the first preselected value is then measured. The first length is compared to the second length, wherein the text is improperly oriented if the first length is greater than the second length.

37 Claims, 9 Drawing Sheets

METHOD AND DEVICE FOR DETERMINING ORIENTATION OF TEXT

BACKGROUND

Imaging devices, such as scanning devices and digital cameras, generate machine-readable image data (sometimes referred to simply as image data) representative of an image of an object. The process of generating image data representative of an image of the object is sometimes referred to as scanning the object. One example of an object is a document having text printed thereon. In some scanning devices, the document is set on a platen, and image data is generated by a carriage moving relative to the platen within the scanning device. The carriage has devices that generate image data representative of an image of the object located on the platen. In other scanning devices, the document is placed into an automatic document feeder and then moved past a stationary component, such as a stationary carriage, that scans the document. Digital cameras, on the other hand, generate image data by focusing the image onto a two-dimensional photosensor device that generates image data without the need for moving a carriage.

The image data is typically transmitted to a viewing device that replicates the image of the scanned object based on the image data. For example, the viewing device may be a video monitor that processes the image data to display the image of the object. In another example, the viewing device may be a printer that processes the image data to print an image of the object.

The viewing device replicates the image of the object as it was scanned. For example, if the document was placed upside down in a scanner, the viewing device will display the replicated image upside down. Likewise, if the document is scanned side ways, it will be replicated on the viewing device side ways. A viewer of the replicated image must then manipulate the image in order to rotate it to the proper orientation. This process is typically time consuming and may be cumbersome to the inexperienced viewer.

Furthermore, optical character recognition engines are typically unable to recognize improperly oriented text. Accordingly, the image data generated by an improperly oriented document typically cannot have an optical character recognition engine applied to it.

SUMMARY

A method of determining the orientation of text is disclosed herein. An embodiment of the method may comprise measuring the contrasts associated with an upper edge of the text relative to a background. A first length of the upper edge of text having contrasts that are at least a first preselected value is measured. In addition to measuring the contrasts associated with the upper edge of the text, contrasts associated with a lower edge of the text are measured relative to the background. A second length of the lower edge of text having contrasts that are at least the first preselected value is then measured. The first length is compared to the second length, wherein the text is improperly oriented if the first length is greater than the second length.

DETAILED DESCRIPTION

Figure 1:
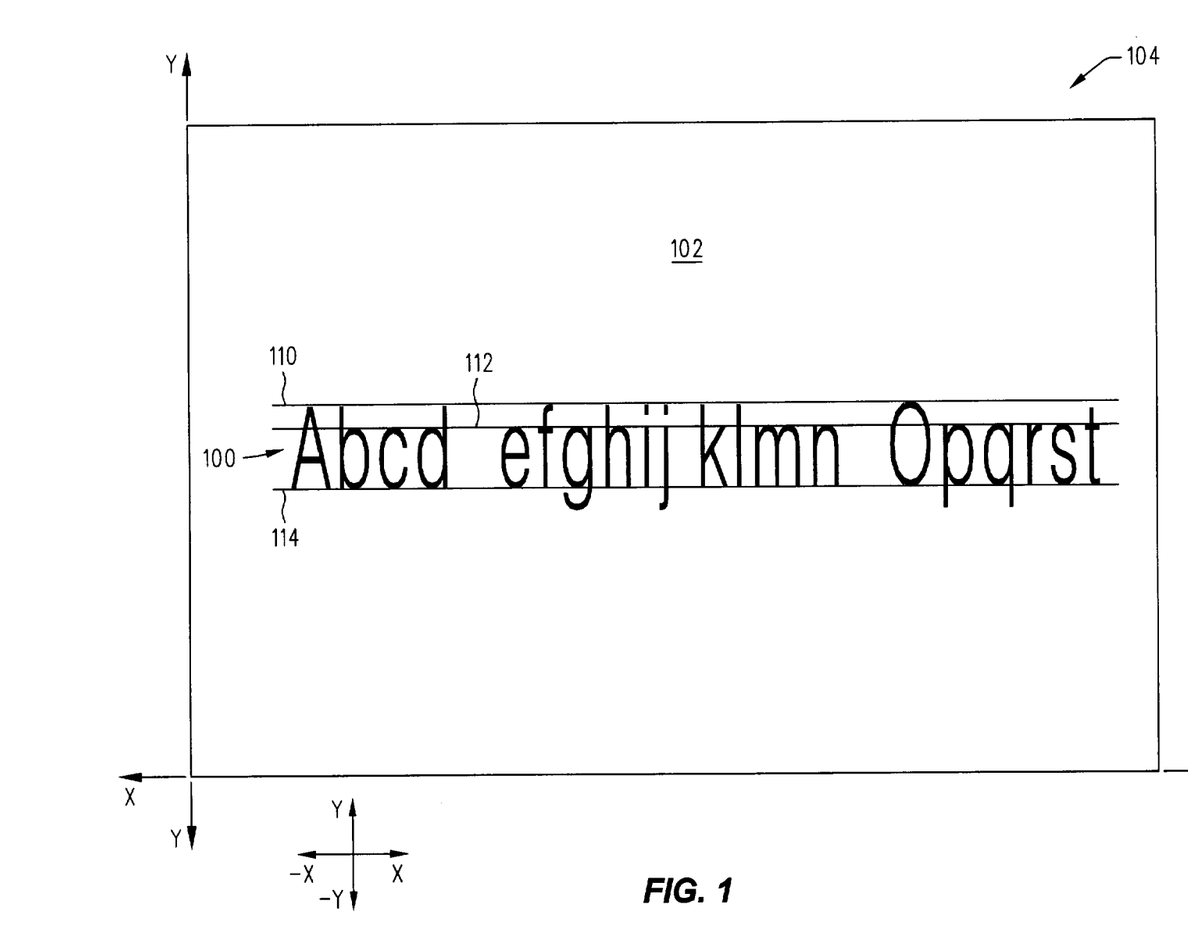
FIG. 1 is an illustration of text displayed on a viewing device.

An illustration of text 100 displayed on the face 102 of a viewing device 104 is shown in FIG. 1. That the viewing device 104 of FIG. 1 is, for illustration purposes, an enlarged, partial view of a conventional viewing device. A typical viewing device may have several long lines of text instead of the one short line of text 100 shown in FIG. 1. The viewing device 104 may be any device that produces an image based on machine-readable image data (sometimes referred to herein simply as image data). Examples of imaging devices include video monitors and documents printed by printers.

The image data may be stored on a computer-readable medium. Likewise, a computer program that analyzes the image data, as set forth below, to determine the orientation of images represented by the image data may also be stored on a computer-readable medium. The computer-readable medium may include an electronic, magnetic, optical or other physical device or means that can store a computer program and data for use by or in connection with a computer-related system or method. The computer-related system or method may run the program and analyze the image data to determine the proper orientation of an image represented by the image data. The computer-related system or method may also manipulate the image data to properly orient the image as is described in greater detail below.

An image is typically displayed on the face 102 of the viewing device 104 using a plurality of picture elements or pixels (not shown). A pixel is similar to a dot that may be bright, dark, or multiple levels of gray therebetween. The image data determines the gray scale associated with each pixel depending on a pixel value assigned to each pixel. Therefore, the image data and thus, the pixel values, determine whether pixels are bright, dark, or levels of gray therebetween. When displaying text, a plurality of dark pixels may be combined on a background of bright pixels to generate black text characters displayed on a white background. The pixel values representative of relatively bright pixels may be relatively high numbers, and the pixel values representative of relatively dark pixels may be relatively low numbers. In some imaging systems, bright pixels are representative of relatively low pixel values and dark pixels are representative of relatively high pixel values.

In one embodiment, the viewing device 104 is a video monitor having the text 100 displayed thereon. In another embodiment, the viewing device 104 is a piece of paper wherein the text 100 is printed on the paper by a printer. The image data from which the text 100 was produced may be generated by many sources. In one embodiment, a document (not shown) having the text 100 printed thereon is scanned by a scanner. The scanner generates the image data representative of the text, which may be replicated by the viewing device 104 to display the text 100. In another embodiment, a digital camera (not shown) generates the image data.

For orientation purposes, four directions and two axes are used as references for the viewing device 104 and for images displayed thereon. An X axis extends along an edge of the viewing device 104. For example, if the viewing device 104 is a video monitor, the X axis may extend parallel to the lower edge of the video monitor. A Y axis extends substantially perpendicular to the X axis. In the aforementioned example of the viewing device 104 being a video monitor, the Y axis may extend parallel to the left edge of the video monitor. The aforementioned directions are along the X axis and the Y axis and are referred to as positive and negative directions along both the Y axis and the X axis as shown in FIG. 1. In the embodiment of the viewing device 104 described herein, properly oriented text extends parallel to the X axis and in the positive X direction.

Having described the text 100 and the viewing device 104, an embodiment of the process of determining the proper orientation of the text 100 will now be described. As described above, the process may be accomplished using a computer (not shown), wherein the computer processes image data representative of the text 104, FIG. 1. It should be noted that the text 100 shown in FIG. 1 is properly oriented. Examples of improperly oriented text are provided further below.

For reference purposes, the text 100 is described as having three reference lines. The reference lines are referred to as the upper line 110, the middle line 112 and the lower line 114. The upper line 110 contacts the upper edge of the text 100. More specifically, the upper line 110 contacts the top edges of upper-case characters and the top edges of some longer lower-case characters. The lower line 114 contacts the lower edges of the upper-case characters in addition to the lower edges of most lower-case characters. The lower edge of the characters associated with the lower line 114 is sometimes referred to as the baseline. The middle line 112 extends between the upper line 110 and the lower line 114. Accordingly, the middle line 112 bisects most upper-case characters and contacts the top edges of many lower-case letters.

Portions of the characters that extend above the middle line 112 are sometimes referred to as ascenders and portions of the characters extending below the lower line 114 are sometimes referred to as descenders. Both the ascenders and the descenders contribute to noise that decreases the contrasts in the proximity of the ascenders and the descenders relative to the background. Text typically has more ascenders than descenders. Therefore, the contrasts associated with the text 100 in the proximity of the lower line 114 is typically higher and more well-defined than the contrasts associated with the upper line 110 and the middle line 112.

Furthermore, the contrasts in the proximity of the lower line 114 are more consistent than the contrasts in the proximity of the upper line 110. The contrasts tend to be higher and more consistent because of the few descenders proximate the lower line 114. These contrasts yield a well-defined bright/dark transition along the lower line 114 relative to the background, and this transition causes relatively high and consistent contrasts. The contrasts associated with the upper line 110 and the middle line 112, on the other hand, tend to be lower and less consistent because of the large number of characters that have ascenders. This inconsistency results in less defined transitions between the upper edges of the characters and the background and results in less consistent and lower contrasts.

The process for determining the orientation of the text 100 relative to the X axis, in summary, compares the contrasts associated with the upper edges of the characters with the contrasts associated with the lower edges of the characters. The analysis forms lines of high constrasts along portions of the text 100 that correspond to the top and bottom of the text 100. If longer lines of high contrasts are located in the proximity of lower portions of the text 100 than the upper portions of the text 100, then the text 100 is properly oriented. On the other hand, if longer lines of high contrasts are located in the proximity of the upper portions of the text 100 than the lower portions of the text 100, then the text 100 is upside down.

An embodiment of the above-described analysis may be applied to the image data to determine if the text represented by the image data is oriented in a landscape or portrait orientation. In summary, the image data is analyzed as though the text 100 is oriented along the X axis. If the analysis creates a plurality of small segments of high contrasts, the text is likely misoriented. The analysis may continue as though the text extends along the Y axis. If this second analysis creates longer lines of high contrasts, the text is more likely misoriented. An algorithm may be applied to the image data in order to correct the orientation.

Figure 2:
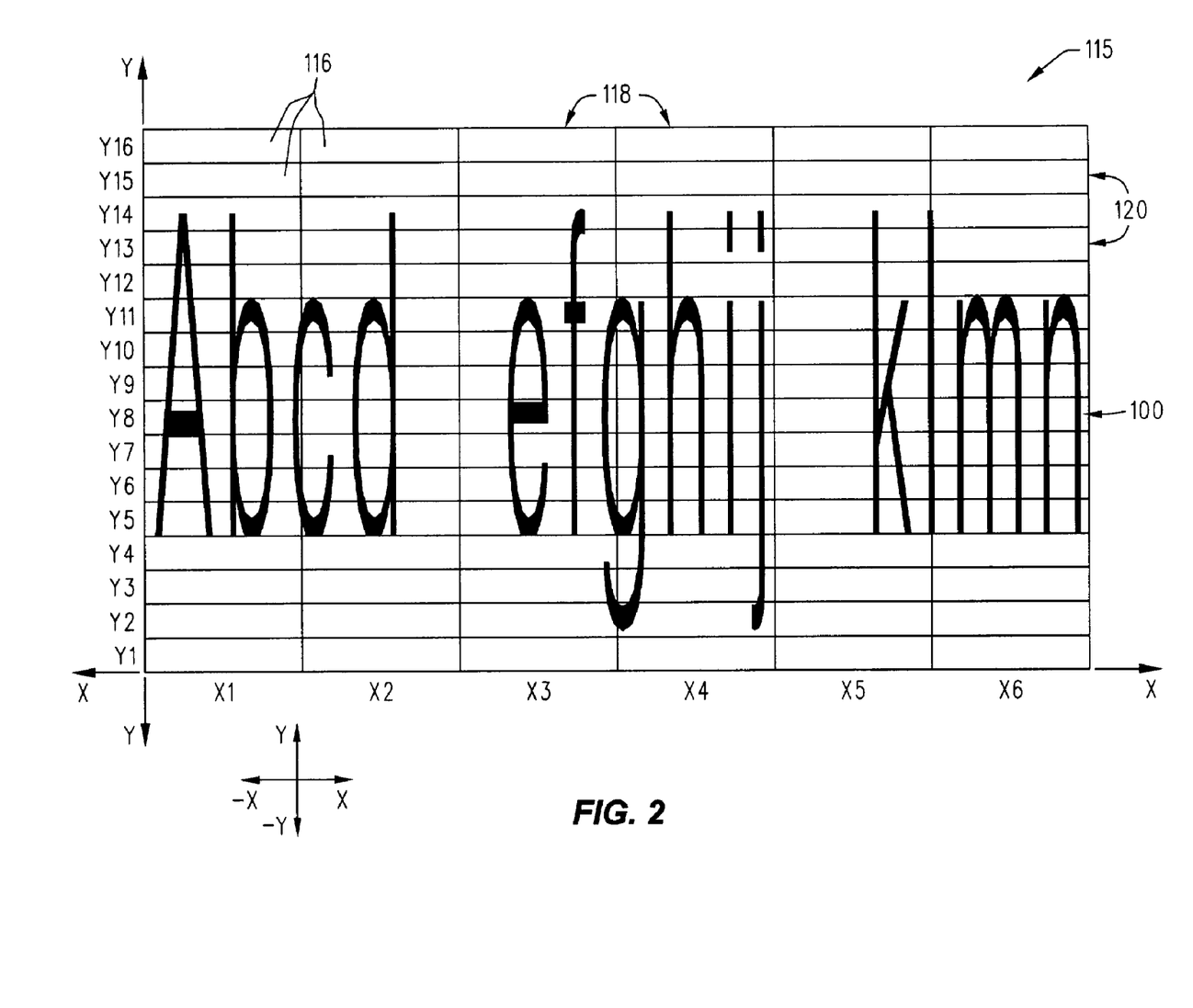
FIG. 2 is an embodiment of the image displayed on the viewing device of FIG. 1 arranged as a plurality of tiles.

Having summarily described the process of determining the orientation of text, the process will now be described in greater detail. The following description describes determining if the text is upside down followed by a description of determining whether the text is oriented as landscape instead of portrait. The face 102 of the viewing device 104 may be divided into an array 115 as shown in FIG. 2. It should be noted that the face 102 of the viewing device 104 is shown as being divided into the array 115, which is for illustration purposes only. In reality, the image data representative of images displayed on the face 102 of the imaging device 104 is processed based on the array 115. As described below, the text 100 of FIG. 2 has been elongated in order to better illustrate the array 115. The array 115 has a plurality of tiles 116 or pixel groupings. The tiles 116 are arranged to form a plurality of columns 118 extending parallel to the Y axis and a plurality of rows 120 extending parallel to the X axis. The columns 118 and the rows 120 are sometimes referred to as the first and second pluralities of pixel groupings, respectively or visa versa.

In the non-limiting embodiment described herein, the tiles 116 are rectangular and have approximately sixty-four pixels extending parallel to the X axis and four pixels extending parallel to the Y axis. Accordingly, each tile represents sixty-four pixel values extending parallel to the X axis and four pixel values extending parallel to the Y axis. The length to which a tile extends parallel to the Y axis is referred to as the height of the tile and the length to which a tile extends parallel to the X axis is referred to as the width of the tile. The heights of the tiles 116 in such an embodiment are one-sixteenth the widths of the tiles 116. In order to illustrate such short tiles 116, the text 100 has been elongated, which has caused the tiles 116 to be elongated for better illustration. Tile sizes other than those described herein may be generated depending on the image data and the image that is represented by the image data. For example, in one embodiment, the tiles have heights of eight pixels and widths of sixty four pixels.

The use of tiles 116 being sixty-four pixel values wide is an example of an embodiment used to determine the proper orientation of certain types of text. The following example is based on determining the orientation of text having a pitch of approximately ten characters per inch. The following example is further based on the image data representative of the text being generated using a sampling rate or precision of three-hundred dots per inch (dpi) or pixel values per inch. Based on the tile sizes, each tile 116, on average, contains horizontal portions of 2.2 characters. Therefore, the probability is high that adjacent tiles 116 extending parallel to the X axis and through a sentence or word will contain at least one portion of a text character. These adjacent tiles 116 may be analyzed to determine the proper orientation of the text 100 as described in greater detail below. The number of pixel values constituting each of the tiles 116 may be set for a specific purpose and for a specific sampling rate. For example, if the image data is generated at a sampling rate of six-hundred dpi, the tiles 116 may have one-hundred twenty-eight pixel values extending along the X axis to yield an average of 2.2 horizontal portions of characters per tile.

The array 115 of tiles 116 forms a Cartesian coordinate system wherein the columns 118 are referenced as columns X1 to X6, and the rows 120 are referenced as rows Y1 to Y16. The locations of the pixels that generate the text 106 are known by the aforementioned computer or the like that determines whether the orientation is correct. Accordingly, the tile to which each pixel value representative of each pixel is known and may be analyzed to determine the proper orientation as described in further detail below.

The tiles 116 are then down-sampled. More specifically, the pixel values constituting the tiles 116 are down-sampled. Down-sampling reduces the number of pixel values represented by a tile. The processes of creating the array of columns 118 and sampling the tiles 118 may constitute down-sampling. In the example of the tiles 116 being sixty-four pixel values wide and four pixel values high, the two-hundred fifty-six pixel values in each tile may be represented by a single pixel value. In the non-limiting embodiment described herein, the pixel values are represented by the average pixel value. The same sampling procedure may be applied to the example of the tiles being sixty-four pixel values wide and eight pixel values high wherein the five-hundred twelve values in each tile may be represented by a single pixel value that is the average of the five-hundred twelve pixel values. In the non-limiting embodiment described above, the average pixel value will vary between zero for a very dark tile and two-hundred fifty-five for a very bright tile. Sampling techniques other than averaging may be applied to the tiles 116 as described in greater detail below.

Down-sampling causes the loss of some data. In the examples of the above-described rectangular tiles 116, the tiles 116 have widths that are greater than their heights. Therefore, more data is retained regarding the pixel values extending along the heights or parallel to the Y axis than is retained regarding pixel values extending along the widths or parallel to the X axis. Accordingly, small increments in pixel values along the Y axis may be analyzed to accurately detect changes in the contrasts of the image represented by the image data. Other embodiments of the methods described herein may detect small changes in the contrasts along the X axis. These changes in contrast are used to determine orientation of the text as described in greater detail below.

Figure 3:
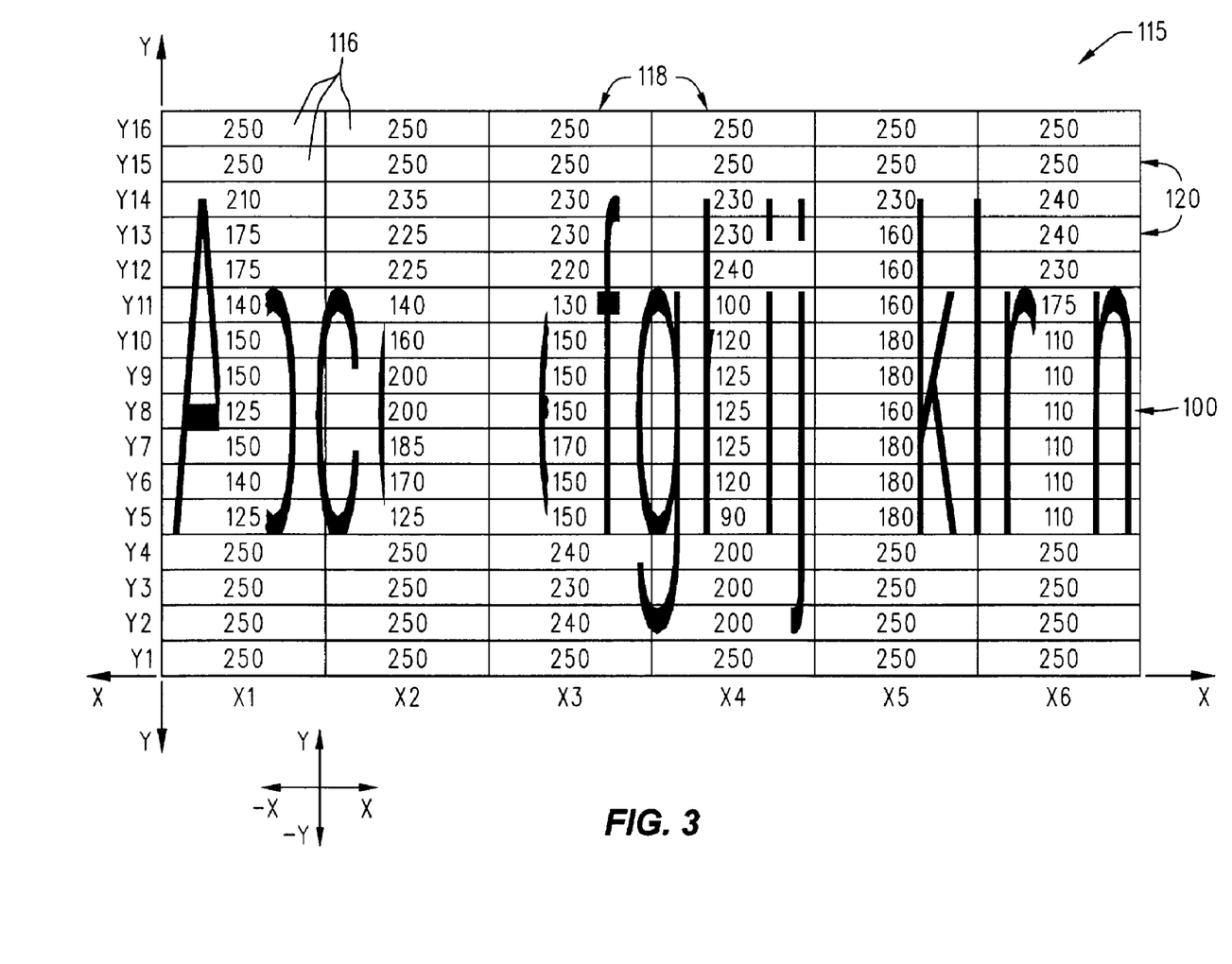
FIG. 3 is an embodiment of the tiles of FIG. 2 sampled using averaging.

An example of the average pixel values associated with the text 100 is shown in FIG. 3. The numbers in the tiles 116 of FIG. 3 represent the average pixel values in each of the tiles 116. Thus, a tile of FIG. 3 that has a large number means that its corresponding tile in FIG. 2 includes few, if any, portions the text 100. A tile of FIG. 3 that has a low number, on the other hand, means that its corresponding tile in FIG. 2 includes many portions of the text 100. The background tiles have average pixel values of two-hundred fifty, which is for illustration purposes. The background may vary slightly, but the variation would have little, if any, affect on the determination of proper orientation of the text 100.

An edge detection algorithm is applied to the down-sampled array of FIG. 3 along an axis to detect bright/dark transitions along the axis. The edge detection algorithm, in summary, is used to detect portions of the text that have high contrasts relative to the background. The embodiment of the edge detection algorithm described herein calculates the differences between sampled values of the tiles 116 along the axis to which it is applied. In order to detect upper and lower edges of text, the edge detection algorithm may be applied in a first direction followed by an opposite second direction. In the example described herein, the edge detection algorithm is applied in the Y direction. Accordingly, differences are calculated in the Y direction and bright/dark transitions in the columns 118 along the Y axis are detected.

In the example described herein, the edge detection algorithm detects the lower edges of the text characters. In a separate process, the upper edges of the text characters are detected using an edge detection algorithm. As described above, properly oriented text will have higher and more consistent contrasts along the lower edges of the characters relative to the background than along the upper edges of the characters. Accordingly, if the text is properly oriented, the edge detection algorithm applied to the lower edges of the characters will detect higher and more consistent contrasts than the algorithm applied to the upper edges of the characters.

An example of an edge detection algorithm to detect the lower edges of characters is achieved by application of a minus one over one kernel. The minus one over one kernel outputs high values when high dark to bright contrasts exist between adjacent values when applied in the negative Y direction. Accordingly, the minus one over one kernel outputs high numbers when applied to the lower edges of the text 100. An example of an algorithm to detect the upper edges of characters is achieved by application of a one over minus one kernel. The one over minus one kernel functions opposite the minus one over one kernel and outputs high numbers when applied to dark to bright transitions in the positive Y direction. Accordingly, the one over minus one kernel outputs high numbers when applied to the top edges of the text 100.

In another embodiment, the minus one over one kernel is applied to the sampled data in the negative Y direction. The minus one over one kernel will output large positive numbers when dark to bright transitions are located, which are indicative of the lower edges of text characters. In addition, the minus one over one kernel outputs large negative numbers when bright to dark transitions are located. The large negative numbers are indicative of the upper edges of text characters.

Figure 4:
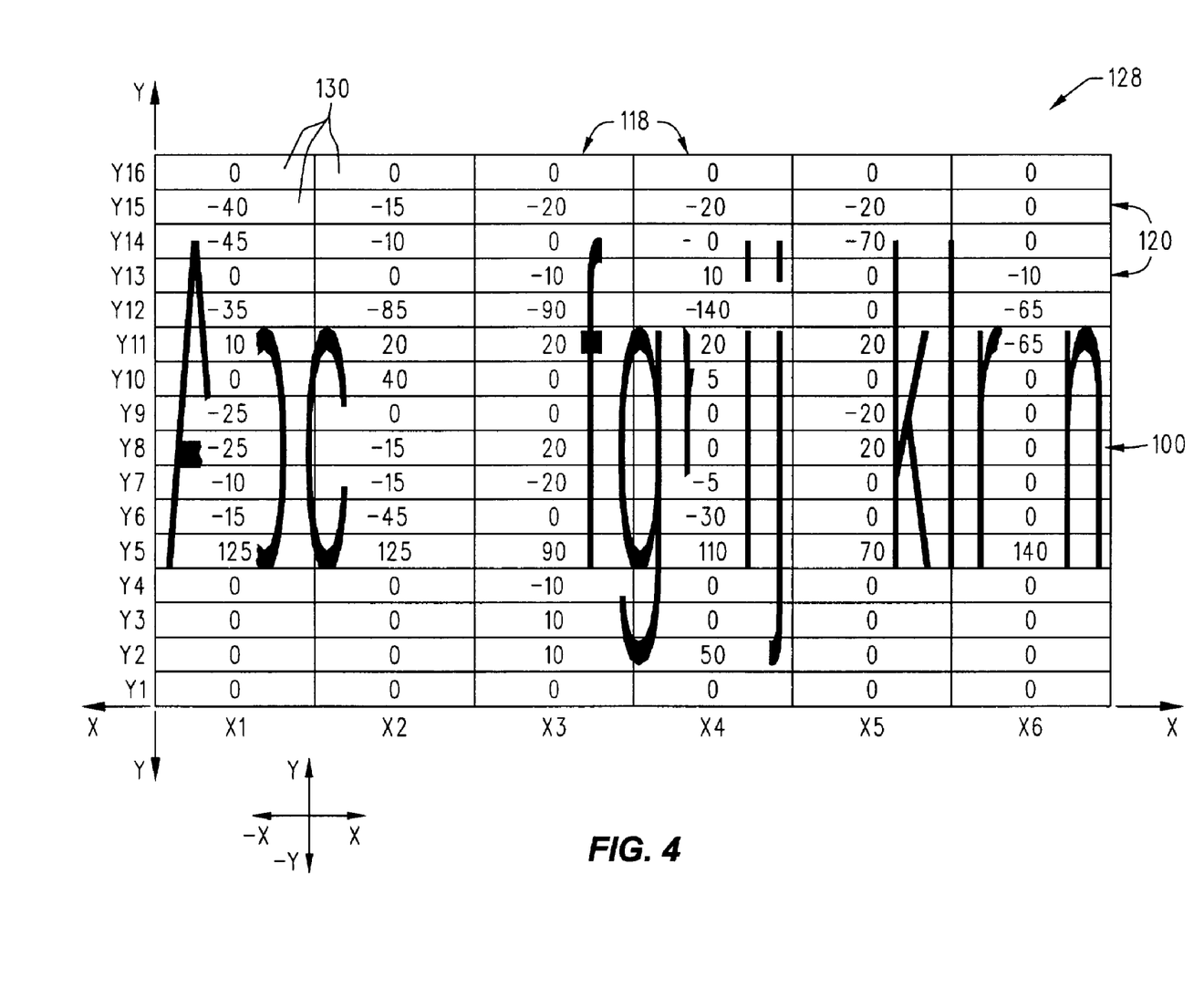
FIG. 4 is an embodiment of the tiles of FIG. 3 after application of an edge detection algorithm.

FIG. 4 shows the results of a minus one over one kernel applied to the array 115 of FIG. 3. The results are illustrated as an array 128 consisting of a plurality of tiles 130 that contain the results of the minus one over one kernel. Large positive numbers are indicative of dark to bright transitions located when the minus one over one kernel is applied to the text 100 in the negative Y direction. Accordingly, the large positive numbers are indicative of detections of the lower edges of the text 100. Large negative numbers are indicative of bright to dark transitions located when the minus one over one kernel is applied to the text 100 in the negative Y direction. Accordingly, the large negative numbers are indicative of detections of the upper edges of the text 100.

The analysis to determine the proper orientation of the text 100 continues by searching the array 128 of FIG. 4 for strings of large positive and negative differences. The positive differences locate the lower edges of the text 100 and the negative differences locate the upper edges of the text 100. The detection of long strings of large positive differences are indicative of properly oriented text. Likewise, the detection of long strings of large negative differences is indicative of text that is oriented upside down. The terms "long" and "short" as used herein are relative. For example, a histogram of the lengths of strings of negative and positive differences may be created. The mean length of the strings of negative differences may be compared to the mean length of the strings of positive differences. The longer mean may be considered to be "long" and the shorter mean may be considered to be "short."

In the present example, the text 100 is properly oriented. Therefore, the string of positive differences will be larger than the string of negative numbers. In other words, the edge contrasts at the lower line 114, FIG. 1, are greater and more consistent than the edge contrasts at the upper line 110 or the middle line 112. Had the text 100 been upside down, the aforementioned detections would have detected longer strings of negative differences than positive differences.

Searching for the strings of differences may commence with searching for a difference that exceeds a first preselected value. This difference is sometimes referred to as the first difference. The search for the first difference may commence at one edge of the array 128 and continue in a raster-type scan parallel to the Y axis. The search in the non-limiting embodiment described herein commences in the column X1 and scans the rows between row Y1 and row Y16. The first difference corresponds to a bright to dark transition that exceeds a contrast corresponding to the first preselected value.

After the first difference is located, a search is conducted for a second difference located in a column that is adjacent the column of the first difference. The search for the second difference is performed to locate a bright to dark transition that is adjacent the bright to dark transition associated with the first difference. For example, the second difference may be representative of lower edges of characters that are adjacent the lower edges of characters corresponding to the first difference. The second difference may be a difference that exceeds a second preselected value. In addition, the second difference is adjacent or close to the first difference and is located in a column that is adjacent or close to the column containing the first difference. Subsequent differences are located in the same manner that the second difference is located.

With reference to the array 128 of FIG. 4, the search may locate a first difference that has a value of at least a first preselected value of one-hundred. In the search technique described above, the difference of one-hundred twenty-five located at column X1, row Y5 will be located and identified as the first difference. As shown in FIG. 4, the above-described search locates differences that correspond to the lower edges of the characters 'A' and 'b'.

With reference to the above-described embodiment, the second difference corresponds to edges of characters in a tile that is next to the tile containing the lower edges of the characters 'A' and 'b'. Further to the above-described embodiment, the second difference is a difference that is adjacent the first difference and is located in a column adjacent the column containing the first difference. The second difference in the present embodiment is the greatest difference that meets the aforementioned criteria and exceeds a second preselected value. In the following example, the second preselected value is seventy-five. The difference meeting the above criteria has the value of one-hundred twenty-five and is located at column X2, row Y5. One embodiment for searching the second and subsequent differences has been described above; however, other embodiments may be used, and some of these embodiments are described in greater detail further below.

The second and subsequent differences may exceed second preselected values that are smaller than the first preselected value. These differences reduce the probability that a string of differences commences on noise. By setting the first preselected value high, the process significantly reduces the probability that the first difference will be caused by noise. Therefore, it is much more likely that the string of differences is caused by the edge of characters as described herein.

As set forth above, pursuant to the present embodiment, the second difference is located at the tile located at column X2, row Y5. More specifically, as shown in FIG. 4, the first difference was located in column X1; accordingly, the second difference must be located in column X2. The differences adjacent the first difference are column X2, rows Y4, Y5, and Y6. Only the difference of one-hundred twenty-five located at the tile in column X2, row Y5 meets the second preselected value of seventy-five. If other adjacent tiles 130 met or exceeded the second preselected value, the tile having the greatest difference would be selected as the second difference.

As set forth above, subsequent differences are located in the same manner that the second difference was located. For example, a third difference of ninety is located at column X3, row Y5, a fourth difference of one-hundred ten is located at column X4, row Y5, a fifth difference is located at column X5, row Y5, and a sixth difference is located at column X6, row Y5. In the present embodiment differences are continually located until one of the aforementioned criteria cannot be achieved. In one embodiment, differences subsequent to the first difference may be located in both directions along the X axis rather than the one direction described in the above example.

Figure 5:
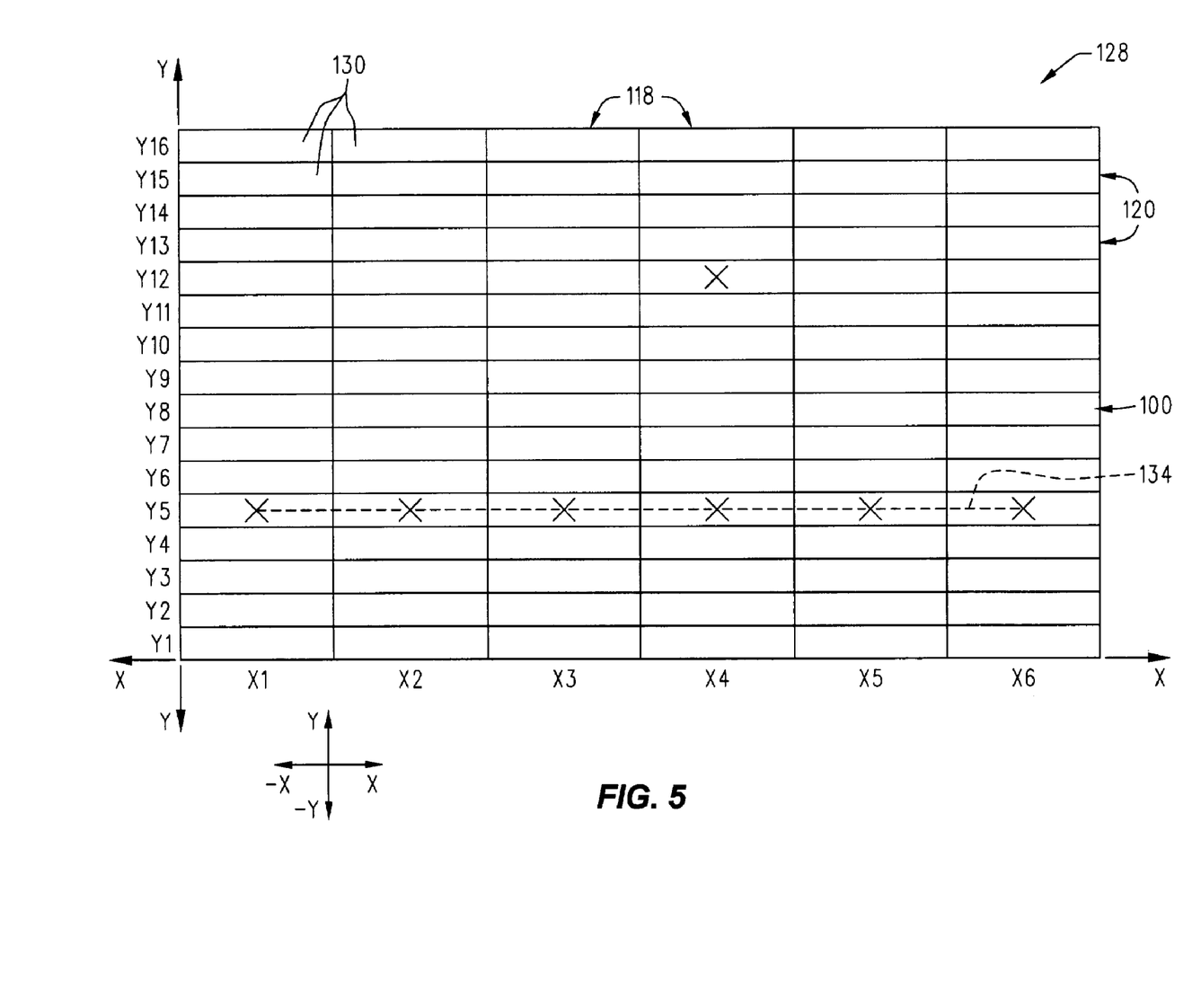
FIG. 5 shows the results of an embodiment of a search routine applied to the tiles of FIG. 4.

A string of differences meeting the above-described search criteria is created and its length is measured. Referring again to the example provided herein, a string of differences meeting the above-described difference criteria are shown by a line 134 in FIG. 5. Markers are placed in the tiles 128 that meet the above-described search criteria. As shown in FIG. 5, the line 134 has a length of six tiles and would likely be longer had more characters been illustrated in the example.

A second string of differences corresponding to the upper edges of the text 100 will also be created and measured. The second string of differences will be compared to the first string of differences to determine whether the text 100, FIG. 1, is properly oriented. If the second string of differences is longer than the first string of differences, then the text 100, FIG. 1, is upside down. Likewise, if the second string of differences is shorter than the first string of differences, the text 100 is properly oriented. If the text 100 is upside down, an algorithm may be applied to the image data to rotate the image data one-hundred eighty degrees. In the example provided herein, the text 100 is properly oriented, so the first string of differences will be longer than the second string of differences.

In the non-limiting example described herein, the top edge of the text 100 is detected by application of the minus one over one kernel. As described above, the minus one over one kernel outputs high negative numbers upon the detection of the upper edges of text. The output of the kernel is shown in FIG. 4, wherein the differences associated with the top edges of the text 100 are relatively large negative numbers.

The process of detecting the upper edges of the text 100 is similar to the process of detecting the lower edges of the text 100. A first negative difference that is less than a third preselected value is located. In the non-limiting example described herein, the third preselected value is the negative of the first preselected value. Accordingly, the third preselected value in this example is negative one-hundred. Likewise, second and subsequent negative differences are located that are less than a fourth preselected value. In the non-limiting embodiment described herein, the fourth difference is the negative of the second preselected value, which is negative seventy-five. When these values are located, a second string or strings of differences are measured as was described above.

Because the text 100 is properly oriented in the example provided herein, the upper edges of the text 100 have lower and less consistent contrasts than the upper edges of the text. These lower and less consistent contrasts are indicative of the lower values of the differences shown in FIG. 4. The only difference less than the fourth preselected value is negative one-hundred forty and is located in the tile at column X4, row Y12. There is no difference in column X5 that is less than the negative second preselected value. Additionally, there are no other differences less than the negative of the first preselected value. Thus, the string of differences associated with the upper edges of the text 100 is much smaller than the above-described string of differences associated with the lower edges of the text 100.

The string of differences associated with the upper edges of the text 100 is shown in FIG. 5. As shown and described above, the string of differences consists of a single tile at row X4, column Y12. Accordingly, the string of differences associated with the lower edges of the text 100 (represented by the line 134) is longer than the string of differences associated with the upper edges of the text 100. Therefore, the text 100 is oriented properly. Had the string of differences associated with the upper edges of the text 100 being longer than the string of differences associated with the lower edges of the text 100, the text would be upside down. In such a situation, an algorithm may be applied to the text to rotate the text one-hundred eighty degrees.

In most circumstances, a document has many more lines of text than the text 100 shown in FIG. 1. There are typically several lines of text that are substantially longer than the line of text 100 shown in FIG. 1. Therefore, when a typical document is analyzed, there may be a plurality of strings of differences that are to be analyzed. In such a situation, the mean length of strings of differences associated with the upper edges of text may be compared to the mean length of strings of differences associated with lower edges of text. If the mean length associated with the upper edges is shorter than the mean length associated with the lower edges, the text is most likely properly oriented. It should be noted that other analysis methods may be applied to the plurality of strings of differences.

Having described embodiments to determine whether text is upside down, embodiments will now be described to determine whether text is sideways or perpendicular to the X axis of FIG. 1. Sideways text is sometime referred to as being vertically oriented or having a landscape orientation.

Figure 6:
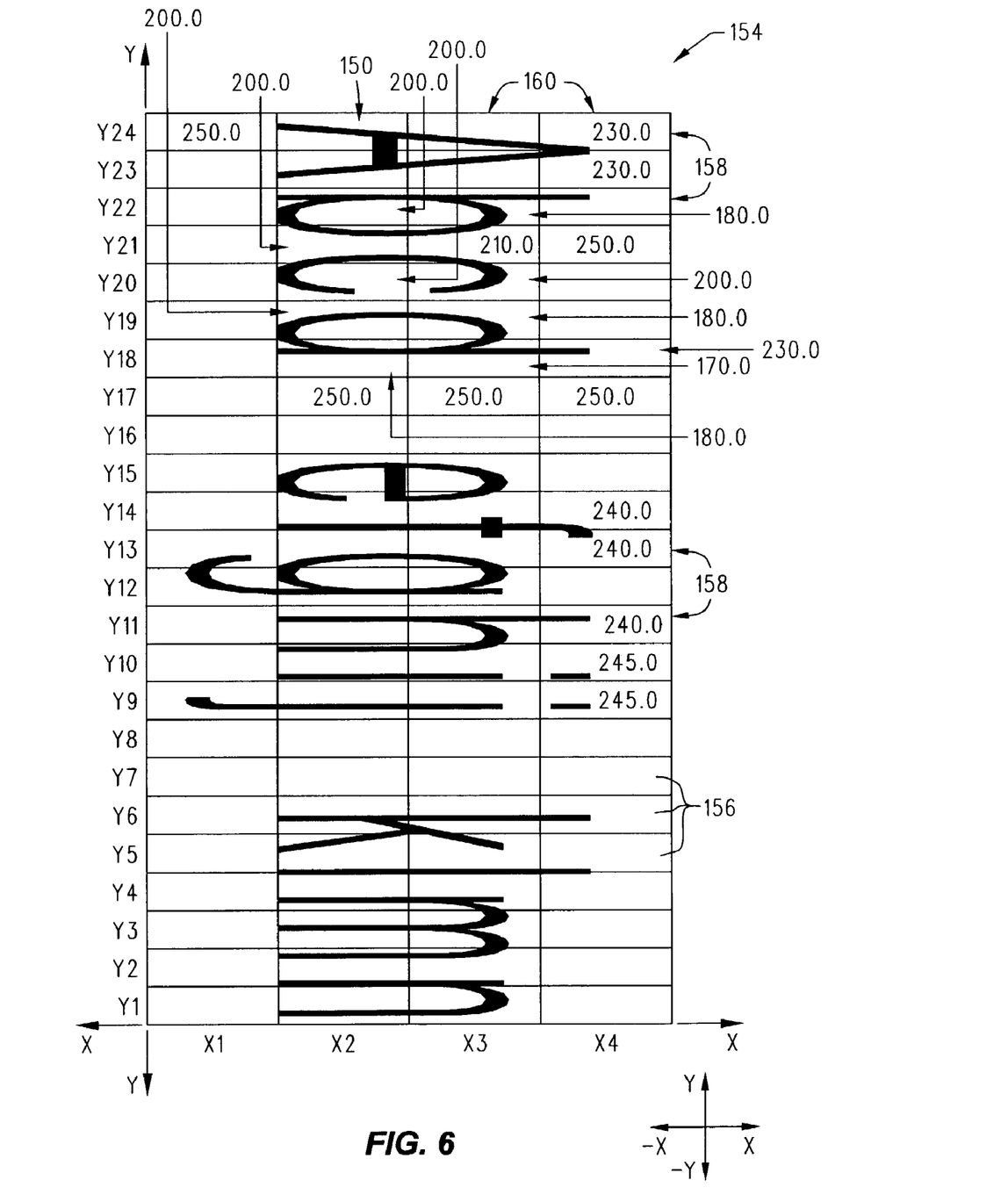
FIG. 6 is an embodiment of vertically or landscape oriented text.

An example of vertically or landscape oriented text 150 is shown in FIG. 6. In summary, the analysis described above is applied to the image data to generate the strings of differences. The analysis is then performed orthogonal to the previous analysis. The differences are analyzed to determine which direction yields the longest strings, among other criteria. A rotation algorithm may then be applied to the image data to properly orient the text.

Having summarily described embodiments of detecting vertically oriented text, the embodiments will now be described in greater detail. In order to better illustrate the methods for determining orientation of the text 150, it has been extended along the X axis in the same manner that the text 100 of FIG. 2 was extended along the Y axis. For convenience, the same text used in the example of FIG. 2 has been used as the text 150 in FIG. 6.

An array 154 may be generated by a plurality of tiles 156 in a manner similar to the array 115 of FIG. 2. In order to illustrate the vertical text 150, the array 154 extends in the Y direction to form a plurality of rows 158 referenced as row Y1 to row Y24. The array 154 forms a plurality of columns 160 referenced as column X1 to column X4. The pixel values of the tiles 156 are sampled in a similar manner as the pixel values of the tiles 116 in the array 115 of FIG. 3. For example, the average pixel value of each of the tiles 156 may be calculated.

Differences between adjacent sampled values of the tiles 156 is calculated in the Y direction as described above. Strings of differences extending along the X direction are then located and analyzed. For example, the lengths of the strings of differences may be measured as described above. The strings of differences will only extend for lengths equal to the height of the text 150. Then the strings will be terminated by the spacing between lines of text. Accordingly, when the above-described analysis is applied to the vertically oriented text 150, the result is a plurality of very short strings of differences. These strings of differences may be compared to the strings of differences generated by the analysis described below.

Figure 7:
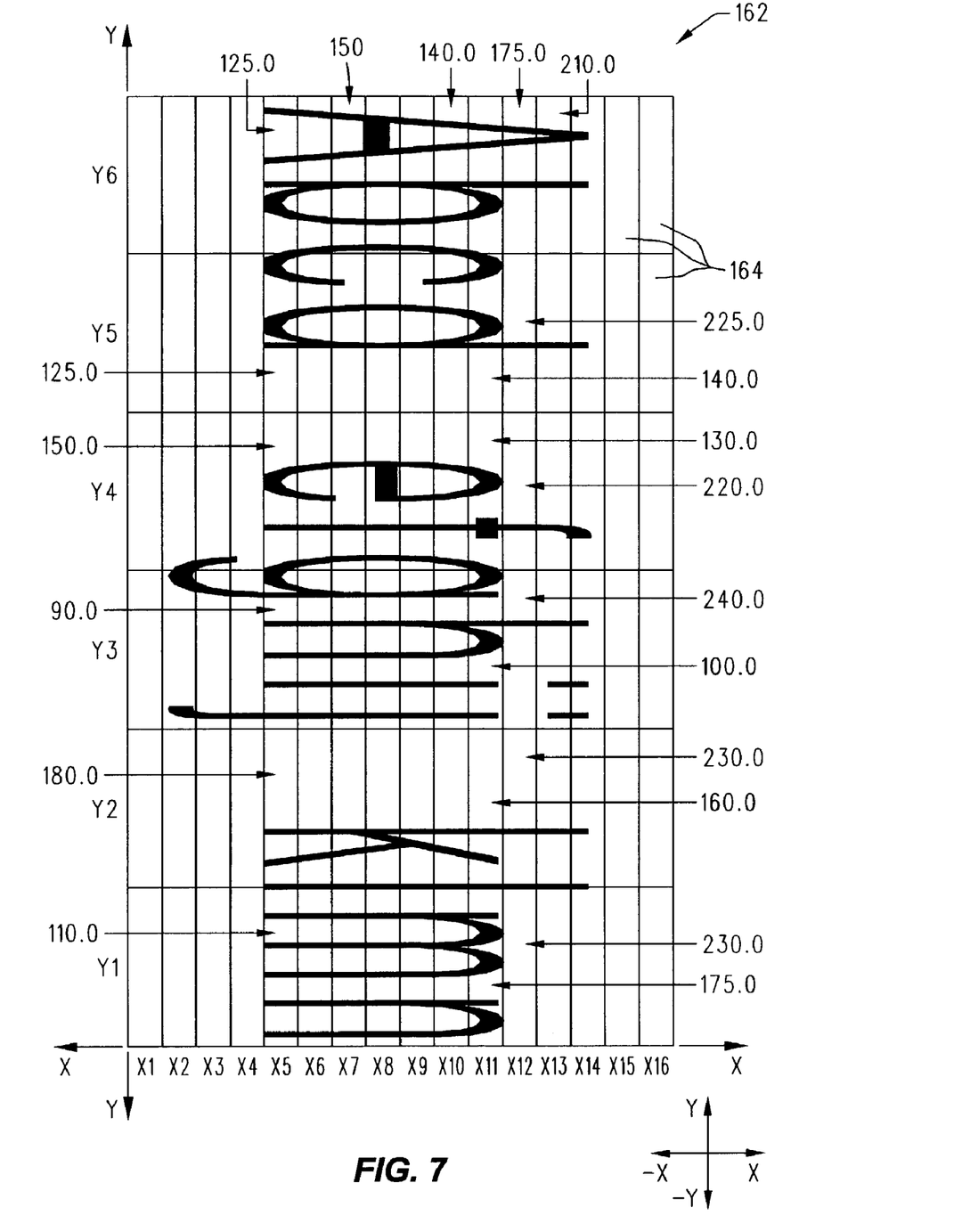
FIG. 7 is an embodiment of sideways-displayed text.

Referring to FIG. 7, the analysis continues by generating tiles that are orthogonal to the tiles 156 in the array 154 of FIG. 6. An array 162 is generated comprising a plurality of tiles 164. Unlike the above-described tiles, the tiles 164 of the array 162 extend in the Y direction further than the X direction. For example, the tiles 164 may have heights of sixty-four pixels and widths of four pixels. In one embodiment, the heights of the tiles 164 are the same as the widths of the tiles 116 of FIG. 2. Likewise, in this embodiment, the widths of the tiles 164 are the same as the heights of the tiles 116 of FIG. 2.

After the tiles 164 have been generated, the pixel values located therein are sampled. The text 150 of FIG. 7 is the same as the text 100 of FIG. 2, therefore, the average pixel values of the tiles 164 correspond to the average pixel values of the tiles 116 of FIG. 3. For example, the average pixel values in the tiles of column X5 of FIG. 7 correspond to the average pixel values of the row Y5 of FIG. 3. Due to illustration constraints, not all the average pixel values have are able to be included in the array 162 of FIG. 7. However, the more relevant average pixel values along the edge of the text 150 have been included in the array 162. The tiles having no portions of the text 150 are deemed to have an average pixel value of two-hundred fifty.

An edge detection algorithm similar to the ones described above is applied to the image data in the X direction to detect the edges of the text. In the embodiment described herein, the edge detection algorithm is applied by calculating differences between average pixel values in rows 158 parallel to the X axis rather than in columns 160 parallel to the Y axis as was described above. The application of the edge detection algorithm will yield large positive numbers upon detection of dark to bright transitions and large negative numbers upon the detection of bright to dark transitions when applied in the positive X direction. Thus, the edges of the text 150 facing the negative X direction will be represented by large positive numbers.

Figure 8:
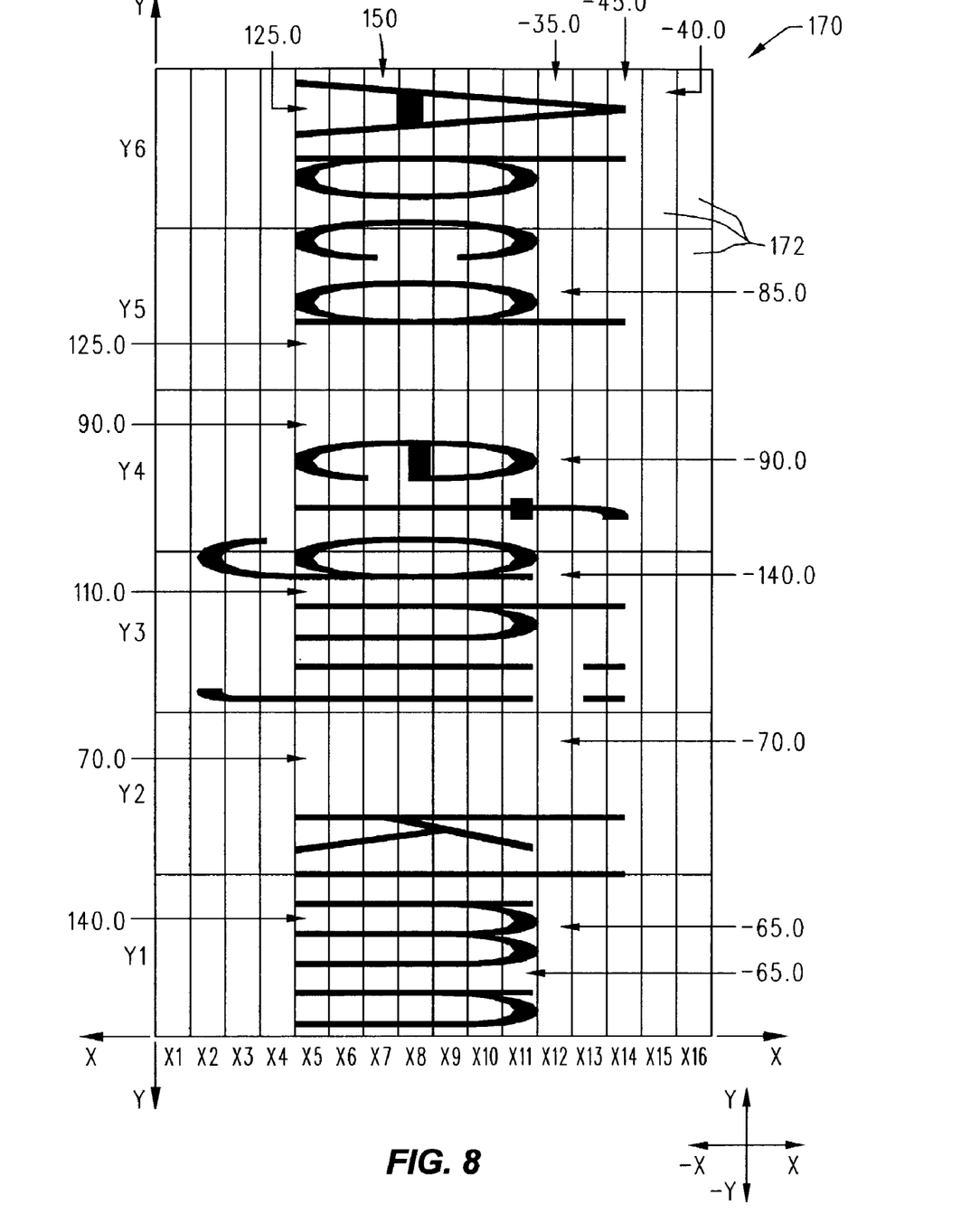
FIG. 8 is an embodiment of the tiles of FIG. 7 after application of an edge detection algorithm.

The results of the application of an edge detection algorithm applied to the array 162 of FIG. 7 are shown in an array 170 FIG. 8, which is made of a plurality of tiles 172. Due to illustration constraints only the differences along the edges of the text 150 have been shown in FIG. 8. Two strings of differences are calculated as described above. One string is based on positive differences and the other string is based on negative differences. These two string extend parallel to the Y axis rather than parallel to the X axis as described in the previous embodiment.

Figure 9:
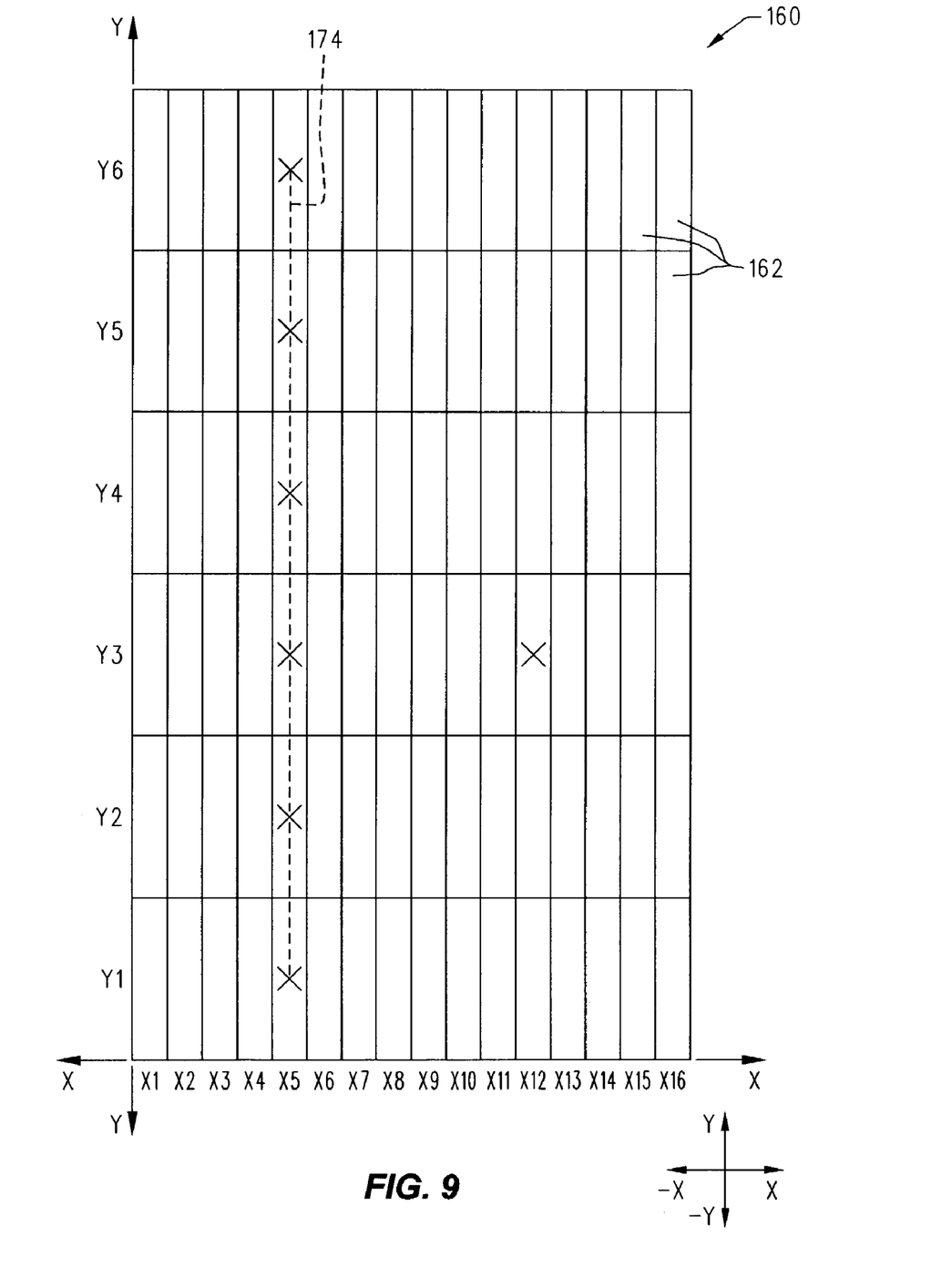
FIG. 9 shows the results of an embodiment of a search routine applied to the tiles of FIG. 8.

The two strings of differences are shown in FIG. 9. The string of positive differences is represented by a line 174. The negative differences only extend one tile at column X12 row Y3. Accordingly, the longer string of differences is positive and correspond to the lower edges of the text 150, FIG. 7, which faces the negative X direction. Therefore, the text 150 is oriented so that it extends in the negative Y direction and must be rotated ninety degrees counterclockwise to be properly oriented. If, on the other hand, the longer string of differences faced the positive X direction relative to the text 150, FIG. 7, the text 150 would extend in the positive Y direction. The text 150 would need to be rotated ninety degrees clockwise to be properly oriented.

Having described some embodiments of the orientation methods, other embodiments will now be described.

Referring to the application of the edge detection algorithms, in some situations, a difference exceeding the first preselected value may not exist. In such situations, the image may not contain a contrast that exceeds the first preselected value. Therefore, the first preselected value may be lowered to accommodate the features of the image. The same may apply to the second preselected value.

In the non-limiting embodiment described herein, the second preselected value is less than the first preselected value. The preselected values are minimal differences that are searched. Thus, the greater first preselected value assures that an edge of a character, and not noise, is initially located. The use of the lower second preselected value enables the searching to locate character edges that may not be as sharp as the ones resulting in the aforementioned first difference. Therefore, a continuous string of differences may be located even though some of the differences do not represent contrasts that are as sharp as the first difference. In another embodiment, the first and second preselected values are the same.

The search for the second and subsequent differences may proceed in a first direction and a second direction that is opposite the first direction. For example, with reference to FIG. 4, after the first difference is located, second and subsequent differences may be located in both the positive and negative X directions. Therefore, if a contrast meeting the criteria of the first difference is located in the middle of a line of text, a string of differences as long as the whole line of text may be located.

In one embodiment, strings of differences that are unusually long are not analyzed. For example, if the strings of differences have an average length of one-thousand pixel values and one string of differences has a length of one-thousand five-hundred pixel values, the longer string of differences may be discarded. The long string of differences may be due to features other than text. For example, the long string of differences may be due to an extraneous line or other printed material on the document. Such objects typically should not be analyzed to determine the proper orientation of text.

In another embodiment, the user is prompted as to whether the image contains text. For example during a scanning process, the user may be prompted as to whether the image is a text document. If the image is a text document, the analysis to determine proper orientation of the text may be commenced.

Other embodiments exist for down-sampling the image data. In the example described above, sampling was achieved by calculating the average pixel value of the tiles 116, FIG. 2. In other embodiments, sampling is achieved by bilinear sampling, bicubic sampling, and weighted averaging. In yet another embodiment, the image data has a low-pass filter or convolution applied to it prior to down sampling. The filtering serves to attenuate extraneous data so as to lessen its affect on the orientation analysis.

Referring again to FIG. 4, in some situations, a column may not have a difference that meets the aforementioned second preselected values. For example, the text may have punctuation or spaces that result in their tiles 118, FIG. 3, having low values. Accordingly, the differences associated with these low tile values will be small, which may cause a string of differences to terminate before it should. In such situations, the second preselected value may be lowered or eliminated during a search of one or more columns. This lowered second preselected value enables a line to be generated through portions of the image where the bright/dark transitions are relatively subtle.

In a similar situation, a difference that meets the aforementioned first preselected value may not exist. In this situation, the first preselected value may be lowered to a point where the first difference may be located. If the first preselected value has to be lowered a great amount, the analysis may conclude that analysis of the text orientation is not prudent.

What is claimed is:

1. A method of determining the orientation of text, said text extending substantially horizontal, said method comprising:
    measuring the contrasts associated with an upper edge of said text relative to a background;
    measuring a first length of said upper edge of text having contrasts that are at least a first preselected value;
    measuring the contrasts associated with a lower edge of said text relative to said background;
    measuring a second length of said lower edge of text having contrasts that are at least said first preselected value; and
    comparing said first length to said second length, wherein said text is improperly oriented if said first length is greater than said second length.

2. The method of claim 1 and further comprising rotating said text one-hundred eighty degrees if said first length is greater than said second length.

3. The method of claim 1, wherein said measuring a first length comprises:
    locating a first portion of said text having a contrast that exceeds a first preselected value; and
    locating subsequent portions of said text having contrasts that exceed a second preselected value;

said first length being the distance between said first portion of said text and one of said subsequent portions of said text.

4. The method of claim 3, wherein said first preselected value is greater than said second preselected value.

5. The method of claim 3, wherein said first length is the longest distance between any of the portions of said text.

6. The method of claim 1, wherein said measuring a second length comprises:
locating a first portion of said text having a contrast that exceeds a first preselected value; and
locating subsequent portions of said text having contrasts that exceed a second preselected value;
said second length being the distance between said first portion of said text and one of said subsequent portions of said text.

7. The method of claim 6, wherein said second length is the longest distance between any of the portions of said text.

8. The method of claim 1, where said first length and said second length are compared to a third preselected value, and wherein said text is rotated ninety degrees if said first length and said second length are less than said third preselected value.

9. A method of determining the orientation of a text relative to a first axis, said method comprising:
measuring first contrasts relative to a background of at least one first edge of said text parallel to said first axis;
measuring at least one first length of said at least one first edge of text having contrasts that are at least a first preselected value;
measuring second contrasts relative to said background of at least one second edge of said text parallel to said first axis, said second edge being opposite said first edge;
measuring at least one second length of said at least one second edge of text having contrasts that are at least a second preselected value;
measuring third contrasts relative to said background of at least one second edge of said text parallel to a second axis, said second axis being perpendicular to said first axis;
measuring at least one third length of said at least one second edge of text having contrasts that are at least a third preselected value;
measuring fourth contrasts relative to said background of at least one fourth edge of said text parallel to said second axis, said fourth edge being opposite said third edge; and
measuring at least one fourth length of said at least one second edge of text having contrasts that are at least a fourth preselected value;
wherein the longer of either said first length, said second length, said third length, or said fourth length corresponds to the lower edge of said text.

10. The method of claim 9, wherein said first axis is horizontal, wherein said at least one first edge of said text is the lower edge of said text relative to said first axis, and wherein said at least one third edge of text is the left edge of said text relative to said second axis.

11. The method of claim 10, and further comprising:
rotating said text one-hundred eighty degrees if said second length is the longest length;
rotating said text ninety degrees counterclockwise if said third length is the longest length; and
rotating said text ninety degrees clockwise if said fourth length is the longest length.

12. The method of claim 9, wherein said measuring comprises:
locating a first portion of said text having at least one contrast that exceed a first preselected value; and
locating subsequent portions of said text having contrasts that exceed a preselected value that is lower than said first preselected value;
the corresponding length being the distance between said first portion of said text and one of said subsequent portions of said text.

13. The method of claim 9, wherein said first preselected value, said second preselected value, said third preselected value, and said fourth preselected value are equal.

14. A method of determining the orientation of text relative to an axis, said text being represented by image data comprising a plurality of pixel values, said method comprising:
generating an array of pixel value groupings, said array comprising pluralities of pixel value groupings extending perpendicular to said axis;
sampling at least one pixel value in each of said pixel groupings;
calculating first differences between adjacent sampled pixel values in said pluralities of pixel groupings, said first differences corresponding to a first edge of said text;
locating a first difference among said first differences, said first difference exceeding a first preselected value;
locating a first line of differences of said first differences including said first difference, said first line of differences being the greatest differences between subsequent ones of said pluralities of pixel groupings that exceed a second preselected value;
calculating the length of said first line;
calculating second differences between adjacent sampled pixel values in said pluralities of pixel groupings, said second differences corresponding to a second edge of said text, wherein said second edge is opposite said first edge;
locating a second difference among said second differences, said second difference exceeding a third preselected value;
locating a second line of differences of said second differences including said second difference, said second line of differences being the greatest differences between subsequent ones of said pluralities of pixel groupings that exceed a fourth preselected value; and
calculating the length of said second line;
wherein said text is oriented properly if said first line is greater than said second line.

15. The method of claim 14, wherein said text is oriented horizontally and wherein said first edge of said text is the lower edge of said text.

16. The method of claim 15, and further comprising rotating said text one-hundred eighty degrees if said first line is shorter than said second line.

17. The method of claim 14, wherein said sampling at least one pixel value comprises calculating the average pixel value of at least two of said pixel values.

18. The method of claim 14, wherein said sampling at least one pixel value comprises applying bicubic sampling of at least two of said pixel values.

19. The method of claim 14, wherein said sampling at least one pixel value comprises applying weighted averaging to at least two of said pixel values.

20. The method of claim 14, wherein said calculating the differences between adjacent sampled pixel values comprises applying an edge detection algorithm to the sampled pixel values.

21. The method of claim 14, wherein said calculating the differences between adjacent sampled pixel values comprises applying a minus one over one kernel to the sampled pixel values.

22. The method of claim 14, wherein said first preselected value is equal to said second preselected value.

23. The method of claim 14, wherein said first preselected value is greater than said second preselected value.

24. The method of claim 14, wherein said first preselected value is the negative of said third preselected value and wherein said locating a first difference comprises locating a first difference in one of said pluralities of pixel groupings, said first difference being less than said first preselected value.

25. The method of claim 14, wherein at least one of said pixel value groupings is rectangular and comprises a first number of pixel values extending parallel to said axis and a second number of pixel values extending perpendicular to said axis, said first number of pixel values being greater than said second number of pixel values.

26. The method of claim 25, wherein said first number of pixels is about four.

27. The method of claim 25, wherein said second number of pixels is about sixty-four.

28. A device for determining the orientation of text, said text extending substantially horizontal, said device comprising:
 first measuring means for measuring the contrasts associated with an upper edge of said text relative to a background, and for measuring the contrasts associated with a lower edge of said text relative to said background;
 second measuring means for measuring a first length of said upper edge of text having contrasts that are at least a first preselected value, and for measuring a second length of said lower edge of text having contrasts that are at least said first preselected value; and
 comparing means for comparing said first length to said second length, wherein said text is improperly oriented if said first length is greater than said second length.

29. The device of claim 28, and further comprising a third measuring means for measuring said contrasts associated with said lower edge of said text relative to said background.

30. The device of claim 28, and further comprising a fourth measuring means for measuring said second length of said lower edge of text having contrasts that are at least said first preselected value.

31. The device of claim 28 and further comprising a rotating means for rotating said text one-hundred eighty degrees if said first length is greater than said second length.

32. The device of claim 28, wherein said measuring a first length comprises:
 locating a first portion of said text having a contrast that exceeds a first preselected value; and
 locating subsequent portions of said text having contrasts that exceed a second preselected value;
 said first length being the distance between said first portion of said text and one of said subsequent portions of said text.

33. The device of claim 32, wherein said first preselected value is greater than said second preselected value.

34. The device of claim 32, wherein said first length is the longest distance between any of the portions of said text.

35. The device of claim 28, wherein said measuring a second length comprises:
 locating a first portion of said text having a contrast that exceeds a first preselected value; and
 locating subsequent portions of said text having contrasts that exceed a second preselected value;
 said second length being the distance between said first portion of said text and one of said subsequent portions of said text.

36. The device of claim 35, wherein said second length is the longest distance between any of the portions of said text.

37. The device of claim 28, where said first length and said second length are compared to a third preselected value, and wherein said text is rotated ninety degrees if said first length and said second length are less than said third preselected value.

* * * * *